(12) United States Patent
Jones et al.

(10) Patent No.: US 9,418,005 B2
(45) Date of Patent: Aug. 16, 2016

(54) MANAGING GARBAGE COLLECTION IN A DATA PROCESSING SYSTEM

(75) Inventors: Scott Thomas Jones, Austin, TX (US); Frank Eliot Levine, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 893 days.

(21) Appl. No.: 12/235,302

(22) Filed: Sep. 22, 2008

(65) Prior Publication Data

US 2010/0017447 A1  Jan. 21, 2010

Related U.S. Application Data (63) Continuation-in-part of application No. 12/173,107, filed on Jul. 15, 2008, now Pat. No. 8,286,134.

(51) Int. Cl.
*G06F 12/02* (2006.01)
*G06F 9/48* (2006.01)

(52) U.S. Cl.
CPC .......... *G06F 12/0269* (2013.01); *G06F 9/4881* (2013.01)

(58) Field of Classification Search
CPC .................................. G06F 12/0269
USPC ................... 707/813–820; 718/106
See application file for complete search history.

(56) References Cited

U.S. PATENT DOCUMENTS

| | | |
|---|---|---|
| 5,305,454 A | 4/1994 | Record et al. |
| 5,379,432 A | 1/1995 | Orton et al. |
| 5,404,529 A | 4/1995 | Chernikoff et al. |
| 5,465,328 A | 11/1995 | Dievendorff et al. |
| 5,473,777 A | 12/1995 | Moeller et al. |
| 5,475,845 A | 12/1995 | Orton et al. |
| 5,544,318 A | 8/1996 | Schmitz et al. |
| 5,682,537 A | 10/1997 | Davies et al. |
| 5,751,789 A | 5/1998 | Farris et al. |
| 5,764,241 A | 6/1998 | Elliott et al. |
| 5,768,500 A | 6/1998 | Agrawal et al. |
| 5,913,213 A | 6/1999 | Wikstrom et al. |
| 5,930,516 A | 7/1999 | Watts, Jr. et al. |
| 6,012,094 A | 1/2000 | Leymann et al. |
| 6,055,492 A | 4/2000 | Alexander, III et al. |
| 6,108,654 A | 8/2000 | Chan et al. |

(Continued)

FOREIGN PATENT DOCUMENTS

| | | |
|---|---|---|
| CN | 1614555 A | 5/2005 |
| EP | 0649084 A1 | 4/1995 |

(Continued)

OTHER PUBLICATIONS

Sun Java Real-Time System 2.0_01, Garbage Collection Guide, Nov. 21, 2007, http://download.oracle.com/javase/realtime/doc_2.0_u1/release/JavaRTSGarbageCollection.html.*

(Continued)

*Primary Examiner* — Brittany N Allen
(74) *Attorney, Agent, or Firm* — Yee & Associates, P.C.; Parashos Kalaitzis (57) ABSTRACT

A computer implemented method, apparatus, and computer program product for managing garbage collection. Monitoring is performed for a garbage collection state in a virtual machine. Responsive to detecting the garbage collection state, a priority for a set of garbage collection threads is increased.

22 Claims, 4 Drawing Sheets

(56) References Cited

U.S. PATENT DOCUMENTS

| | | | |
|---|---|---|---|
| 6,112,225 A | 8/2000 | Kraft et al. | |
| 6,125,363 A | 9/2000 | Buzzeo et al. | |
| 6,128,611 A | 10/2000 | Doan et al. | |
| 6,158,024 A | 12/2000 | Mandal | |
| 6,178,440 B1 | 1/2001 | Foster et al. | |
| 6,199,075 B1* | 3/2001 | Ungar et al. | 707/206 |
| 6,233,585 B1 | 5/2001 | Gupta et al. | |
| 6,338,159 B1 | 1/2002 | Alexander, III et al. | |
| 6,438,512 B1 | 8/2002 | Miller | |
| 6,442,572 B2 | 8/2002 | Leymann et al. | |
| 6,449,614 B1 | 9/2002 | Marcotte | |
| 6,553,564 B1 | 4/2003 | Alexander, III et al. | |
| 6,601,233 B1 | 7/2003 | Underwood | |
| 6,625,602 B1 | 9/2003 | Meredith et al. | |
| 6,633,897 B1 | 10/2003 | Browning et al. | |
| 6,651,243 B1 | 11/2003 | Berry et al. | |
| 6,654,948 B1 | 11/2003 | Konuru et al. | |
| 6,658,652 B1 | 12/2003 | Alexander, III et al. | |
| 6,662,358 B1 | 12/2003 | Berry et al. | |
| 6,662,359 B1 | 12/2003 | Berry et al. | |
| 6,681,230 B1 | 1/2004 | Blott et al. | |
| 6,697,802 B2 | 2/2004 | Ma et al. | |
| 6,697,935 B1 | 2/2004 | Borkenhagen et al. | |
| 6,728,955 B1 | 4/2004 | Berry et al. | |
| 6,728,959 B1 | 4/2004 | Merkey | |
| 6,742,016 B1 | 5/2004 | Bhoj et al. | |
| 6,751,789 B1 | 6/2004 | Berry et al. | |
| 6,857,120 B1 | 2/2005 | Arnold et al. | |
| 6,874,074 B1* | 3/2005 | Burton et al. | 711/170 |
| 6,880,086 B2 | 4/2005 | Kidder et al. | |
| 6,904,594 B1 | 6/2005 | Berry et al. | |
| 6,931,354 B2 | 8/2005 | Jones et al. | |
| 6,941,552 B1 | 9/2005 | Beadle et al. | |
| 6,954,922 B2 | 10/2005 | Liang | |
| 6,976,263 B2 | 12/2005 | Delaney | |
| 6,993,246 B1 | 1/2006 | Pan et al. | |
| 7,000,047 B2 | 2/2006 | Nguyen et al. | |
| 7,020,696 B1 | 3/2006 | Perry et al. | |
| 7,028,298 B1* | 4/2006 | Foote | 718/104 |
| 7,047,258 B2 | 5/2006 | Balogh et al. | |
| 7,093,081 B2 | 8/2006 | DeWitt, Jr. et al. | |
| 7,114,036 B2 | 9/2006 | DeWitt, Jr. et al. | |
| 7,114,150 B2 | 9/2006 | Dimpsey et al. | |
| 7,162,666 B2 | 1/2007 | Bono | |
| 7,178,145 B2 | 2/2007 | Bono | |
| 7,206,848 B1 | 4/2007 | Zara et al. | |
| 7,222,119 B1 | 5/2007 | Ghemawat et al. | |
| 7,257,657 B2 | 8/2007 | DeWitt, Jr. et al. | |
| 7,278,141 B2 | 10/2007 | Accapadi et al. | |
| 7,296,130 B2 | 11/2007 | Dimpsey et al. | |
| 7,321,965 B2 | 1/2008 | Kissell | |
| 7,325,108 B2 | 1/2008 | Tuel | |
| 7,398,518 B2 | 7/2008 | Dichter | |
| 7,426,730 B2 | 9/2008 | Mathews et al. | |
| 7,474,991 B2 | 1/2009 | DeWitt, Jr. et al. | |
| 7,496,918 B1 | 2/2009 | Dice et al. | |
| 7,526,757 B2 | 4/2009 | Levine | |
| 7,529,914 B2 | 5/2009 | Saha et al. | |
| 7,574,587 B2 | 8/2009 | DeWitt, Jr. et al. | |
| 7,584,332 B2 | 9/2009 | Kogge et al. | |
| 7,587,364 B2 | 9/2009 | Crumbach et al. | |
| 7,610,585 B2 | 10/2009 | Shpeisman et al. | |
| 7,624,137 B2 | 11/2009 | Bacon et al. | |
| 7,653,895 B1 | 1/2010 | James-Roxby et al. | |
| 7,688,867 B1 | 3/2010 | Kizhepat | |
| 7,689,867 B2 | 3/2010 | Rosenbluth et al. | |
| 7,716,647 B2 | 5/2010 | Loh et al. | |
| 7,721,268 B2 | 5/2010 | Loh et al. | |
| 7,779,238 B2 | 8/2010 | Kosche et al. | |
| 7,788,664 B1 | 8/2010 | Janakiraman et al. | |
| 7,921,075 B2 | 4/2011 | Herness et al. | |
| 7,921,875 B2 | 4/2011 | Moriiki et al. | |
| 7,925,473 B2 | 4/2011 | DeWitt, Jr. et al. | |
| 7,962,913 B2 | 6/2011 | Accapadi et al. | |
| 7,962,924 B2 | 6/2011 | Kuiper et al. | |
| 7,996,593 B2 | 8/2011 | Blackmore et al. | |
| 7,996,629 B2 | 8/2011 | Wan et al. | |
| 8,018,845 B2 | 9/2011 | Ruello et al. | |
| 8,024,735 B2 | 9/2011 | Rudd et al. | |
| 8,117,599 B2 | 2/2012 | Edmark et al. | |
| 8,117,618 B2 | 2/2012 | Holloway et al. | |
| 8,132,170 B2 | 3/2012 | Kuiper et al. | |
| 8,136,124 B2 | 3/2012 | Kosche et al. | |
| 8,141,053 B2 | 3/2012 | Levine | |
| 8,156,495 B2 | 4/2012 | Chew et al. | |
| 8,191,049 B2 | 5/2012 | Levine et al. | |
| 8,286,134 B2 | 10/2012 | Jones et al. | |
| 8,381,215 B2 | 2/2013 | Johnson et al. | |
| 8,566,795 B2 | 10/2013 | Dewitt, Jr. et al. | |
| 8,799,872 B2 | 8/2014 | Levine | |
| 8,843,684 B2 | 9/2014 | Jones et al. | |
| 9,176,783 B2 | 11/2015 | Kuiper et al. | |
| 2002/0007363 A1 | 1/2002 | Vaitzblit | |
| 2002/0016729 A1 | 2/2002 | Breitenbach et al. | |
| 2002/0038332 A1 | 3/2002 | Alverson et al. | |
| 2002/0073103 A1* | 6/2002 | Bottomley et al. | 707/200 |
| 2003/0004970 A1 | 1/2003 | Watts | |
| 2003/0023655 A1* | 1/2003 | Sokolov et al. | 709/1 |
| 2003/0061256 A1 | 3/2003 | Mathews et al. | |
| 2003/0083912 A1 | 5/2003 | Covington, III et al. | |
| 2003/0233394 A1 | 12/2003 | Rudd et al. | |
| 2004/0068501 A1 | 4/2004 | McGoveran | |
| 2004/0093510 A1 | 5/2004 | Nurmeia | |
| 2004/0142679 A1 | 7/2004 | Kearns et al. | |
| 2004/0148594 A1 | 7/2004 | Williams | |
| 2004/0162741 A1 | 8/2004 | Flaxer et al. | |
| 2004/0163077 A1 | 8/2004 | Dimpsey et al. | |
| 2004/0178454 A1 | 9/2004 | Kuroda et al. | |
| 2004/0193510 A1 | 9/2004 | Catahan, Jr. et al. | |
| 2004/0215614 A1 | 10/2004 | Doyle et al. | |
| 2004/0215768 A1 | 10/2004 | Oulu et al. | |
| 2004/0216112 A1* | 10/2004 | Accapadi et al. | 718/103 |
| 2004/0220931 A1 | 11/2004 | Guthridge et al. | |
| 2004/0220932 A1 | 11/2004 | Seeger et al. | |
| 2004/0220933 A1 | 11/2004 | Walker | |
| 2004/0268316 A1 | 12/2004 | Fisher et al. | |
| 2005/0021354 A1 | 1/2005 | Brendle et al. | |
| 2005/0080806 A1 | 4/2005 | Doganata et al. | |
| 2005/0086455 A1 | 4/2005 | DeWitt, Jr. et al. | |
| 2005/0091663 A1 | 4/2005 | Bagsby | |
| 2005/0102493 A1 | 5/2005 | DeWitt, Jr. et al. | |
| 2005/0138443 A1 | 6/2005 | Cooper | |
| 2005/0149585 A1* | 7/2005 | Bacon et al. | 707/205 |
| 2005/0155018 A1 | 7/2005 | DeWitt, Jr. et al. | |
| 2005/0155019 A1 | 7/2005 | Levine et al. | |
| 2005/0166187 A1 | 7/2005 | Das et al. | |
| 2005/0204349 A1 | 9/2005 | Lewis et al. | |
| 2005/0256961 A1 | 11/2005 | Alon et al. | |
| 2005/0262130 A1 | 11/2005 | Mohan | |
| 2005/0273757 A1 | 12/2005 | Anderson | |
| 2005/0273782 A1* | 12/2005 | Shpeisman et al. | 718/100 |
| 2006/0004757 A1 | 1/2006 | Watts | |
| 2006/0023642 A1 | 2/2006 | Roskowski et al. | |
| 2006/0031837 A1 | 2/2006 | Theurer | |
| 2006/0059486 A1 | 3/2006 | Loh et al. | |
| 2006/0072563 A1 | 4/2006 | Regnier et al. | |
| 2006/0080486 A1 | 4/2006 | Yan | |
| 2006/0095571 A1 | 5/2006 | Gilgen et al. | |
| 2006/0130001 A1 | 6/2006 | Beuch et al. | |
| 2006/0136914 A1 | 6/2006 | Marascio et al. | |
| 2006/0149877 A1 | 7/2006 | Pearson | |
| 2006/0167955 A1 | 7/2006 | Vertes | |
| 2006/0184769 A1 | 8/2006 | Floyd et al. | |
| 2006/0212657 A1* | 9/2006 | Tuel | 711/133 |
| 2006/0218290 A1 | 9/2006 | Lin et al. | |
| 2006/0259911 A1 | 11/2006 | Weinrich et al. | |
| 2006/0282400 A1 | 12/2006 | Kalavacharia et al. | |
| 2006/0282707 A1 | 12/2006 | Rosenbluth et al. | |
| 2007/0006168 A1 | 1/2007 | Dimpsey et al. | |
| 2007/0033589 A1 | 2/2007 | Nicholas et al. | |
| 2007/0150904 A1 | 6/2007 | Kim et al. | |
| 2007/0169003 A1 | 7/2007 | Branda et al. | |
| 2007/0171824 A1 | 7/2007 | Ruello et al. | |
| 2007/0220495 A1 | 9/2007 | Chen et al. | |

(56) References Cited

U.S. PATENT DOCUMENTS

| | | |
|---|---|---|
| 2007/0220515 A1 | 9/2007 | DeWitt, Jr. et al. |
| 2007/0226139 A1 | 9/2007 | Crumbach et al. |
| 2008/0082761 A1 | 4/2008 | Herness et al. |
| 2008/0082796 A1 | 4/2008 | Merten et al. |
| 2008/0091679 A1 | 4/2008 | Herness et al. |
| 2008/0091712 A1 | 4/2008 | Daherkar et al. |
| 2008/0148240 A1 | 6/2008 | Jones et al. |
| 2008/0148241 A1 | 6/2008 | Jones et al. |
| 2008/0148299 A1 | 6/2008 | Daherkar et al. |
| 2008/0177756 A1 | 7/2008 | Kosche et al. |
| 2008/0189687 A1 | 8/2008 | Levine et al. |
| 2008/0196030 A1 | 8/2008 | Buros et al. |
| 2008/0263325 A1 | 10/2008 | Kudva et al. |
| 2008/0307441 A1 | 12/2008 | Kuiper et al. |
| 2009/0007075 A1 | 1/2009 | Edmark et al. |
| 2009/0044198 A1 | 2/2009 | Kuiper et al. |
| 2009/0083002 A1 | 3/2009 | DeWitt et al. |
| 2009/0100432 A1 | 4/2009 | Holloway et al. |
| 2009/0106762 A1 | 4/2009 | Accapadi et al. |
| 2009/0178036 A1 | 7/2009 | Levine |
| 2009/0187909 A1 | 7/2009 | Russell et al. |
| 2009/0187915 A1 | 7/2009 | Chew et al. |
| 2009/0204978 A1 | 8/2009 | Lee et al. |
| 2009/0210649 A1 | 8/2009 | Wan et al. |
| 2009/0235247 A1 | 9/2009 | Cho et al. |
| 2009/0235262 A1 | 9/2009 | Ceze et al. |
| 2009/0241095 A1 | 9/2009 | Jones et al. |
| 2009/0271549 A1 | 10/2009 | Blackmore et al. |
| 2009/0292846 A1 | 11/2009 | Park et al. |
| 2009/0300224 A1 | 12/2009 | Duffy et al. |
| 2010/0017581 A1 | 1/2010 | Clift et al. |
| 2010/0017583 A1 | 1/2010 | Kuiper et al. |
| 2010/0017584 A1 | 1/2010 | Jones et al. |
| 2010/0017789 A1 | 1/2010 | Dewitt, Jr. et al. |
| 2010/0017804 A1 | 1/2010 | Gupta et al. |
| 2010/0036981 A1 | 2/2010 | Ganesh et al. |
| 2010/0333071 A1 | 12/2010 | Kuiper et al. |
| 2011/0289361 A1 | 11/2011 | Kuiper et al. |
| 2011/0307640 A1 | 12/2011 | Jones et al. |
| 2011/0320173 A1 | 12/2011 | Levine |
| 2012/0191893 A1 | 7/2012 | Kuiper et al. |

FOREIGN PATENT DOCUMENTS

| | | |
|---|---|---|
| EP | 0689141 A2 | 12/1995 |
| EP | 1603307 A2 | 12/2005 |
| JP | H11327951 A | 11/1999 |
| JP | 2002055848 A | 2/2002 |
| JP | 2004199330 A | 7/2004 |
| JP | 2005141392 A | 6/2005 |
| JP | 2008257287 A | 10/2008 |
| KR | 2009098500 A | 9/2009 |
| WO | WO2009014868 A2 | 1/2009 |

OTHER PUBLICATIONS

AIX Versions 3.2 and 4 Performance Tuning Guide, Performance Overview of the Virtual Memory Manager (VMM), Apr. 1997, http://nfosolutions.com/doc_link/C/a_doc_lib/aixbman/prftungd/vm-mov.htm.*

Froyd et al., "Low-Overhead Call Path Profiling of Unmodified, Optimized Code", ACM, ICS'05 Cambridge, Massachusetts, pp. 81-90.

Chanda et al., "Whodunit: Transactional Profiling for Multi-Tier Applications", ACM, EuroSys'07, Mar. 2007 Lisboa, Portugal, pp. 17-30.

Binder, "Portable and Accurate Sampling Profiling for Java", Software—Practice and Experience, vol. 36, Issue 6, May 2006, pp. 615-650.

Dunlavey, "Performance Tuning with Instruction-Level Cost Derived from Call-Stack Sampling", ACM SIGPLAN Notices, vol. 42(8), Aug. 2007, pp. 4-8.

Abdel-Shafi et al., "Efficient User-Level Thread Migration and Checkpointing on Windows NT Clusters," Proceedings of the 3rd USENIX Windows NT Symposium, Jul. 1999, 11 pages.

Alexander et al., "A Unifying Approach to Performance Analysis in the Java environment," IBM Systems Journal, vol. 39, No. 1, Jan. 2000, pp. 118-134.

Alkalaj et al., "Performance of Multi-Threaded Execution in a Shared-Memory Multiprocessor," Proceedings in the 3rd IEEE Symposium on Parallel and Distributed Processing, Dec. 1991, pp. 330-333.

Arpaci-Dusseau, "Implicit Coscheduling: Coordinated Scheduling with Implicit Information in Distributed Systems," ACM Transactions on Computer Systems, vol. 19, No. 3, Aug. 2011, pp. 283-331.

Asokan et al., "Providing Time- and Space- Efficient Procedure Calls for Asynchronous Software Thread Integration," Proceedings of the 2004 International Conference on Compilers, Architecture, and Synthesis for Embedded Systems (CASES '04), Sep. 2004, pp. 167-178.

Barcia et al., "Building SOA solutions with the Service Component Architecture—Part 1," IBM WebSphere Developer Technical Journal, Oct. 26, 2005, 46 pages.

Cao et al., "A Study of Java Virtual Machine Scalability Issues on SMP Systems," Proceedings of the 2005 IEEE International Symposium on Workload Characterization, Oct. 2005, pp. 119-128.

Cerami, "Web Services Essentials: Distributed Applications with XML-RPC, SOAP, UDDI & WSDL," First Edition, Feb. 2002, 286 pages.

Chen et al., "Resource Allocation in a Middleware for Streaming Data," Middleware 2004 Companion, 2nd Workshop on Middleware for Grid Computing, Oct. 2004, pp. 5-10.

Choi et al., "Deterministic Replay of Java Mulithreaded Applications," ACM Sigmetrics Symposium on Parallel and Distributed Tools (SPDT), Aug. 1998, 12 pages.

Foong et al., "Architectural Characterization of Processor Affinity in Network Processing," Proceedings of the IEEE International Symposium on Performance Analysis of Systems and Software, Mar. 2005, 12 pages.

Graham et al., "gprof: a Call Graph Execution Profiler," Proceedings of the 1982 SIGPLAN Symposium on Compiler Construction, Jun. 1982, pp. 120-126.

Harkema et al., "Performance Monitoring of JAVA Applications," Proceedings of the 3rd International Workshop on Software and Performance, Jul. 2002, pp. 114-127.

International Business Machines Corporation, "Pacing support for Time Based Context Sampling," IP.com Prior Art Database Technical Disclosure No. IPCOM000178312D, Jan. 22, 2009, 2 pages.

International Business Machines Corporation, "Process and Thread Sampling—Target Selection in Interrupt Mode," IP.com Prior Art Database Technical Disclosure No. IPCOM000172856D, Jul. 16, 2008, 2 pages.

International Search Report, dated Sep. 3, 2010, regarding Application No. PCT/EP2010/058486, 3 pages.

International Search Report and Written Opinion, dated Aug. 2, 2011, regarding Application No. PCT/EP2011/057574, 9 pages.

Korochkin et al., "Experimental Performance Analysis of the Ada95 and Java Parallel Program on SMP Systems," ACM SIGAda Ada Letters, vol. 23, No. 1, Mar. 2003, pp. 53-56.

Mansouri-Samani et al., "A Configurable Event Service for Distributed Systems," Proceedings of the Third International Conference on Configurable Distributed Systems, May 1996, pp. 210-217.

Meyer et al., "The Devolution of Functional Analysis," ACM SIGMOD Record, vol. 13, No. 3, Apr. 1983, pp. 65-91.

Milton, "Thread Migration in Distributed Memory Multicomputers," The Australian National University, Joint Computer Science Technical Report Series, Feb. 1998, 14 pages.

Mohanty et al., "A Hierarchical Approach for Energy Efficient Application Design Using Heterogeneous Embedded Systems," Proceedings of the 2003 International Conference on Compilers, Architecture, and Synthesis for Embedded Systems, Oct. 2003, pp. 243-254.

Purser et al., "A Study of Slipstream Processors," Proceedings of the 33rd Annual ACM/IEEE International Symposium on Microarchitecture, Dec. 2000, pp. 269-280.

Rinard et al., "Eliminating Synchronization Bottlenecks Using Adaptive Replication," ACM Transactions on Programming Languages and Systems, vol. 25, No. 3, May 2003, pp. 316-359.

(56) References Cited

OTHER PUBLICATIONS

Tam et al., "Thread Clustering: Sharing-Aware Scheduling on SMP-CMP-SMT Multiprocessors," Proceedings of the 2nd ACM SIGOPS/EuroSys European Conference on Computer Systems, Mar. 2007, pp. 47-58.
Tidwell et al., "Programming Web Services with SOAP," First Edition, Dec. 2001, 225 pages.
Tullsen et al., "Handling Long-Latency Loads in a Simultaneous Multithreading Processor," Proceedings of the 34th International Symposium on Microarchitecture, Dec. 2001, pp. 318-327.
von Behren et al., "Capriccio: Scalable Threads for Internet Services," ACM SIGOPS Operating Systems Review, vol. 37, No. 5, Oct. 2003, 268-281.
"Processing Events in a Sequence," Websphere 6.0.2, copyright 2005, 2007, IBM Corporation, 9 pages. Accessed May 12, 2011, http://publib.boulder.ibm.com/infocenter/dmndhelp/v6rxrmx/topic/com.ibm.wbit.help.wirin . . . >.
Whaley, "A Portable Sampling-Based Profiler for Java Virtual Machines," Proceedings of the ACM 2000 Conference on Java Grande (JAVA '00), Jun. 2000, 10 pages.
US 8,589,928, 11/2013, Kuiper et al. (withdrawn).
Office Action, dated Dec. 19, 2011, regarding U.S. Appl. No. 12/173,053, 15 pages.
Final Office Action, dated May 2, 2012, regarding U.S. Appl. No. 12/173,053, 16 pages.
Notice of Allowance, dated Jun. 13, 2013, regarding U.S. Appl. No. 12/173,053, 13 pages.
Office Action, dated Nov. 21, 2011, regarding U.S. Appl. No. 12/173,047, 15 pages.
Final Office Action, dated Jun. 14, 2012, regarding U.S. Appl. No. 12/173,047, 19 pages.
Office Action, dated Apr. 25, 2013, regarding U.S. Appl. No. 12/173,047, 37 pages.
Notice of Allowance, dated Sep. 11, 2013, regarding U.S. Appl. No. 12/173,047, 22 pages.
Notice of Allowance, dated Nov. 20, 2013, regarding U.S. Appl. No. 12/173,047, 21 pages.
Office Action, dated Jan. 5, 2012, regarding U.S. Appl. No. 12/173,107, 21 pages.
Notice of Allowance, dated Jun. 6, 2012, regarding U.S. Appl. No. 12/173,107, 10 pages.
Office Action, dated Jun. 27, 2012, regarding U.S. Appl. No. 12/494,469, 21 pages.
Final Office Action, dated Nov. 6, 2012, regarding U.S Appl. No. 12/494,469, 10 pages.
Notice of Allowance, dated Jan. 17, 2013, regarding U.S. Appl. No. 12/494,469, 7 pages.
Notice of Allowance, dated Nov. 12, 2013, regarding U.S. Appl. No. 12/494,469, 14 pages.
Office Action, dated Sep. 19, 2012, regarding U.S. Appl. No. 12/786,381, 26 pages.
Final Office Action, dated Apr. 3, 2013, regarding U.S. Appl. No. 12/786,381, 55 pages.
Notice of Allowance, dated Aug. 28, 2013, regarding U.S. Appl. No. 12/786,381, 17 pages.
Notice of Allowance, dated Dec. 19, 2013, regarding U.S. Appl. No. 12/786,381, 10 pages.
Office Action, dated Apr. 14, 2014, regarding U.S. Appl. No. 12/786,381, 16 pages.
Final Office Action, dated Sep. 5, 2014, regarding U.S. Appl. No. 12/786,381, 33 pages.
Office Action, dated Feb. 6, 2015, regarding U.S. Appl. No. 12/786,381, 13 pages.
Notice of Allowance, dated Jun. 11, 2015, regarding U.S. Appl. No. 12/786,381, 13 pages.
Office Action, dated Mar. 2, 2012, regarding U.S. Appl. No. 12/813,706, 21 pages.
Notice of Allowance, dated Aug. 20, 2012, regarding U.S. Appl. No. 12/813,706, 5 pages.
Notice of Allowance, dated May 24, 2013, regarding U.S. Appl. No. 12/813,706, 14 pages.
Notice of Allowance, dated Sep. 13, 2013, regarding U.S. Appl. No. 12/813,706, 17 pages.
Notice of Allowance, dated Jan. 17, 2014, regarding U.S. Appl. No. 12/813,706, 13 pages.
Notice of Allowance, dated Apr. 24, 2014, regarding U.S. Appl. No. 12/813,706, 10 pages.
Office Action, dated Oct. 18, 2012, regarding U.S. Appl. No. 12/824,217, 23 pages.
Final Office Action, dated Mar. 20, 2013, regarding U.S. Appl. No. 12/824,217, 35 pages.
Notice of Allowance, dated Sep. 27, 2013, regarding U.S. Appl. No. 12/824,217, 22 pages.
Office Action, dated Oct. 9, 2012, regarding U.S. Appl. No. 13/011,621, 25 pages.
Final Office Action, dated Mar. 18, 2013, regarding U.S. Appl. No. 13/011,621, 30 pages.
Notice of Allowance, dated Jul. 9, 2013, regarding U.S. Appl. No. 13/011,621, 11 pages.

* cited by examiner

MANAGING GARBAGE COLLECTION IN A DATA PROCESSING SYSTEM

CROSS-REFERENCE TO RELATED APPLICATION

This application is a continuation-in-part of patent application U.S. Ser. No. 12/173,107, filed Jul. 15, 2008, now U.S. Pat. No. 8,286,134 entitled: Call Stack Sampling for a Multi-Processor System, which is incorporated herein by reference.

BACKGROUND OF THE INVENTION

1. Field of the Invention

The present disclosure relates generally to an improved data processing system and in particular to a method and apparatus for processing data. Still more particularly, the present disclosure relates to a computer implemented method, apparatus, and computer program code for managing garbage collection in a data processing system.

2. Description of the Related Art

Garbage collection is a form of automatic memory management. A garbage collector or other process attempts to reclaim memory used by objects in the memory that will never be accessed or modified by an application or other process.

Garbage collection frees a programmer from having to worry about releasing objects that are no longer needed when writing applications. Further, garbage collection also may aid programmers in their efforts to make programs more stable because garbage collection may prevent various runtime errors that could occur. Examples of errors that may occur include, for example, dangling pointer bugs and double free bugs.

A dangling pointer bug may occur when a piece of memory is freed while pointers are still pointing to the memory and one of the pointers is used. A double free bug may occur when a region of memory is free and an attempt is made by a program to free that region of memory. Also, memory leaks that occur when a program fails to free memory that is no longer accessed also may be reduced and/or eliminated through garbage collection.

Garbage collection may be used in various environments including in a Java Virtual Machine (JVM). Garbage collection also may be available with other environments including, for example, C and C++.

BRIEF SUMMARY OF THE INVENTION

The different illustrative embodiments provide a computer implemented method, apparatus, and computer program product for managing garbage collection. Monitoring is performed for a garbage collection state in a virtual machine. Responsive to detecting the garbage collection state, a priority for a set of garbage collection threads is increased.

In another illustrative embodiment, a computer comprises a bus; a storage device connected to the bus, wherein program code is stored on the storage device; and a processor unit is connected to the bus. The processor unit executes the program code to monitor for a garbage collection state within an execution environment, and increase a priority of a set of garbage collection threads in response to detecting the garbage collection state.

In still another illustrative embodiment, computer program product for managing garbage collection comprising a computer recordable storage medium and program code stored on the computer recordable storage medium. Program code is present for monitoring for a garbage collection state within an execution environment. Program code is also present, responsive to detecting the garbage collection state, for increasing a priority of a set of garbage collection threads.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including, but not limited to, wireless, wireline, optical fiber cable, RF, etc.

Computer program code for carrying out operations of the present invention may be written in any combination of one or more programming languages, including an object oriented programming language such as, for example, Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
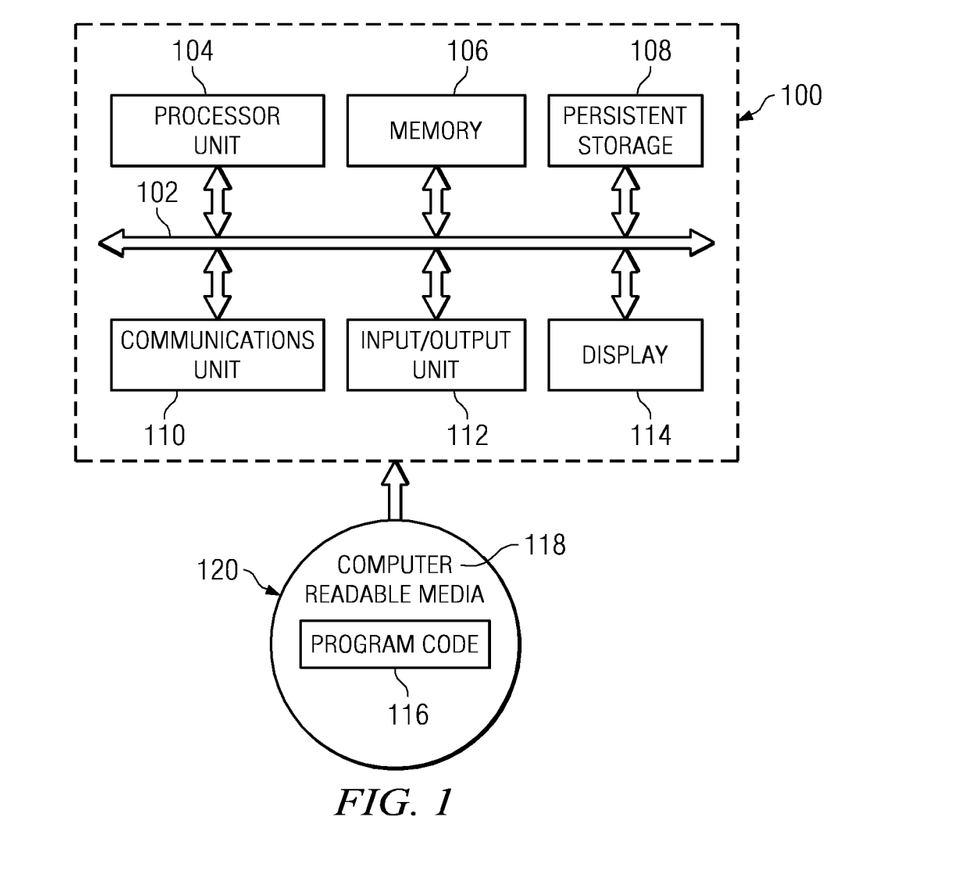
FIG. 1 is a diagram of a data processing system in accordance with an illustrative embodiment.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a number of processors, depending on the particular implementation. A number of items, as used herein, refers to one or more items. For example, a number of processors is one or more processors. These processors may be separate chips or may be cores within a multi-processor core. In other words, a processor may be a processor such as a central processing unit and/or a core within a multi-core central processing unit. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
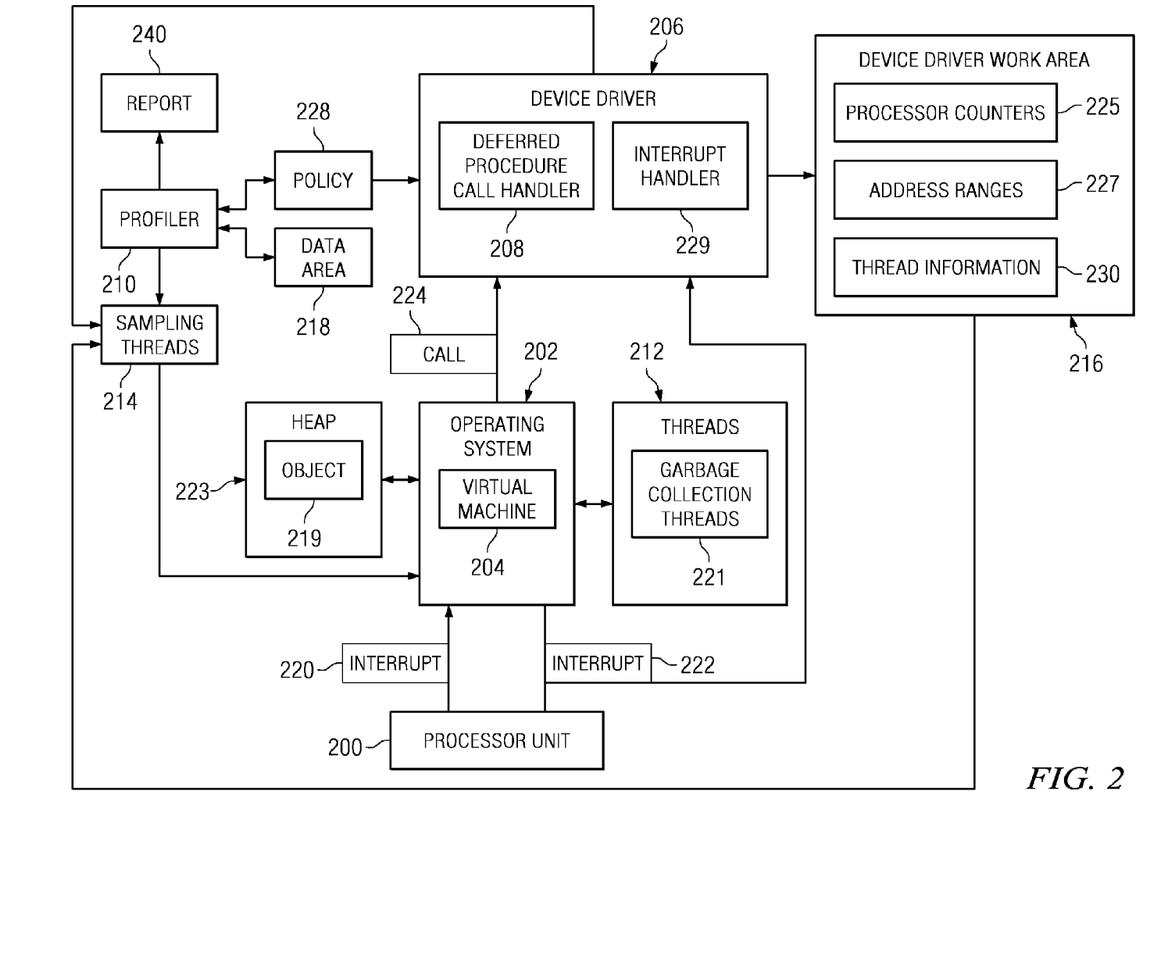
FIG. 2 is a diagram illustrating components that may be used to manage garbage collection in accordance with an illustrative embodiment.

With reference to FIG. 2, a diagram illustrating components to initiate garbage collection management is depicted in accordance with an illustrative embodiment. In the depicted example, the components are examples of hardware and software components found in the data processing system, such as data processing system 100 in FIG. 1.

These components include processor unit 200, operating system 202, virtual machine 204, device driver 206, deferred procedure call handler 208, profiler 210, threads 212, sampling threads 214, device driver work area 216, and data area 218.

Processor unit 200 is similar to processor unit 104 in FIG. 1 and may generate interrupts, such as interrupts 220 and 222 from processors within processor unit 200. These interrupts may be, for example, without limitation, timer interrupts.

In particular, interrupt 220 and interrupt 222 may be generated based on timed interrupts that may be initiated for all of the processors within processor unit 200. In these examples, this type of interrupt may be generated using an advanced programmable interrupt controller within each processor and processor unit 200. Processing of interrupt 220 and interrupt 222 may initiate garbage collection management processes in these illustrative embodiments.

Alternatively, virtual machine 204 initiates garbage collection by detecting that the amount of objects in heap 223, a work area for objects in object 219, exceeds a threshold. In one embodiment, virtual machine 204 notifies profiler 210 that it has started garbage collection for heap 223. Profiler 210 notifies device driver 206 that virtual machine 204 has entered the garbage collection state. In this embodiment, virtual machine 204 notifies profiler 210 that it has completed garbage collection. Profiler 210 then notifies device driver 206 that virtual machine 204 has completed the garbage collection and is no longer in a garbage collection state.

Profiler 210 may use interfaces to virtual machine 204 to identify garbage collection threads 221, in threads 212, and operating system interfaces for operating system 202 to change the priorities of garbage collection threads 221 instead of requiring support from device driver 206. In another embodiment, virtual machine 204 uses operating system interfaces to control the priorities of garbage collection threads 221.

The interrupts may be passed to device driver 206 in a number of different ways. For example, interrupt 220 is passed to device driver 206 through call 224. Alternatively, interrupt 222 is passed directly to device driver 206 via an Interrupt Vector Table (IVT). After receiving an interrupt, device driver 206 may process the interrupt using a deferred procedure call (DPC) to deferred procedure call handler 208 located within device driver 206. Of course, other routines or processes may be used to process these interrupts. The deferred procedure call initiated by device driver 206 is used to continue processing interrupt information from interrupt 222. Device driver 206 determines the interrupted process and thread and may use this information by applying policy 228.

This determination may be made using policy 228. Policy 228 may be a set of rules identifying what actions to take. The rules may include identification of one or more garbage collection thread identifications used to identify an interrupted thread as a garbage collection thread, or checking an indication of garbage collection mode set by virtual machine 204 or profiler 210. In response to determining the garbage collection state, other actions may be taken. These actions may include changing a priority of garbage collection threads. Whether changes to the priority of garbage collection threads occur may depend on what threads are currently executing, what memory ranges are being accessed, what processes are executing, and/or some other suitable criteria.

In these examples, the interrupt handler 229 may identify the address interrupted or the data address being accessed at the time of interrupt 222. For example, a user may identify a set of routines of interest. Profiler 210 may identify the address ranges for a set of routines by obtaining loaded module information or by monitoring addresses of JITed methods to form address ranges 227. Profiler 210 passes address ranges 227 to device driver 206, which places address ranges 227 into device driver work area 216.

In a similar manner, a user may specify a specific object class or object instance meeting specific criteria or a data area referenced by a lock or monitor using profiler 210. Profiler 210 may obtain the data information area from virtual machine 204 and pass this information to device driver 206. In turn, device driver 206 places this information into device driver work area 216 as address ranges 227. In this manner, the interrupt handler may compare the identified address with the set of address ranges stored in device driver work area 216.

Deferred procedure call handler may decide that garbage collection management processes are to be executed using policy 228. For example, policy 228 may state that priority for garbage collection threads should be increased if a garbage collection state is present when interrupt 222 is received. In other illustrative embodiments, policy 228 may include rules stating that garbage collection priority may change if a particular thread is being executed, a particular address range is being accessed, and/or when some other suitable criteria is present.

Figure 3:
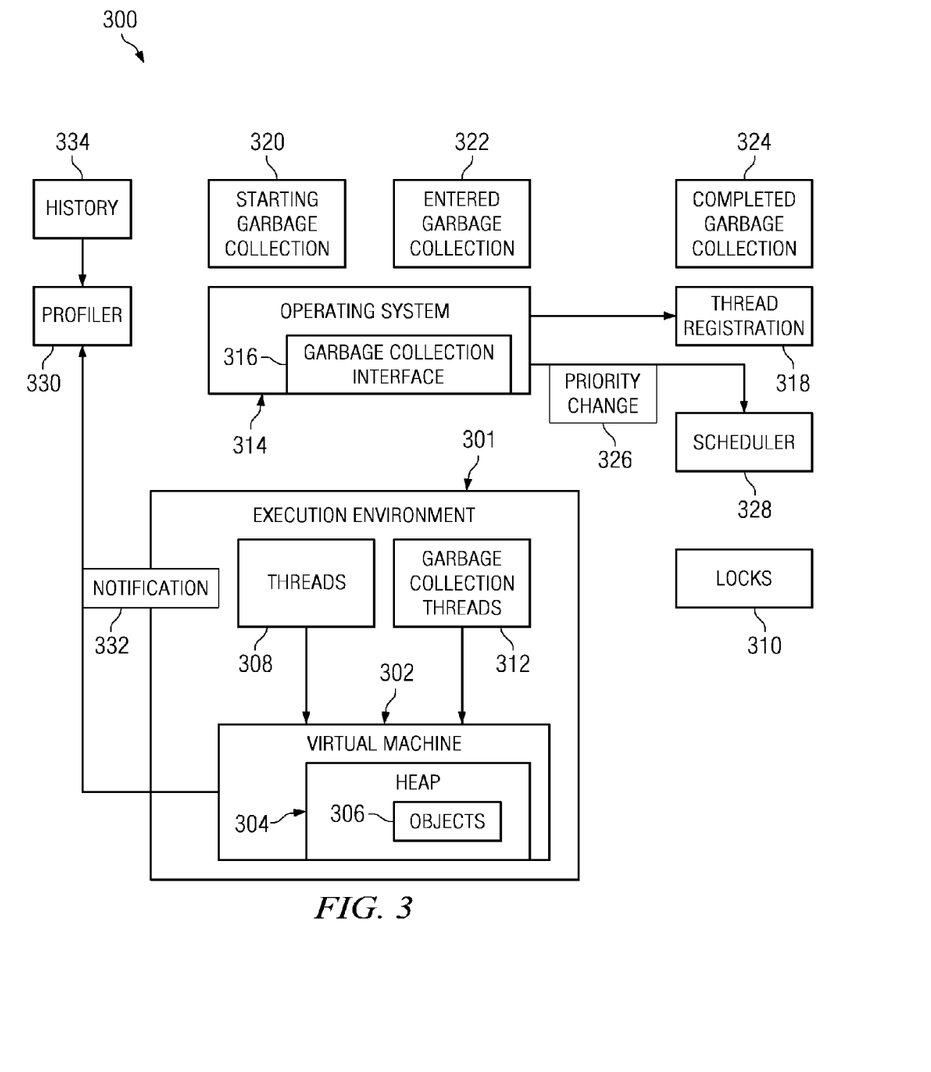
FIG. 3 is a diagram of components used in garbage collection in accordance with an advantageous embodiment.

With reference now to FIG. 3, a diagram of components used in managing garbage collection is depicted in accordance with an advantageous embodiment. In this example, garbage collection environment 300 is an example of an environment in which garbage collection may be managed when a condition occurs in which garbage collection state is present. This garbage collection management may be performed for execution environment 301. Execution environment 301 is any environment in which the execution of code may result in the use and/or creation of objects containing data. In this example, execution environment 301 includes virtual machine 302, which includes heap 304.

Heap 304 contains objects 306. These objects may be allocated during the execution of threads 308. Threads 308 may access objects 306. When a thread within threads 308 accesses an object within objects 306, a lock is obtained for that object from locks 310. This lock prevents other threads from accessing the same object. Once the thread releases the lock for the object, then that object may be accessed by another thread. Of course, in other illustrative embodiments, execution environment 301 may include environments other than virtual machines.

For example, execution environment 301 may be any environment in which threads execute and use memory that requires periodic garbage collection as part of the supported infrastructure, typically when there are data structures that are no longer being used or can be reallocated if needed. When garbage collection is supported, any threads within threads 308 that need to allocate objects must release their locks and wait for garbage collection threads 312 to acquire and release locks from locks 310.

During the phase of acquiring ownership of locks 310 by garbage collection threads 312, it is advantageous for any of threads 308 currently owning at the lock within locks 310 to complete processing as quickly as possible to allow garbage collection threads 312 to acquire locks 310 and begin processing of heap 304. Once garbage collection threads 312 own locks 310, it is advantageous to allow garbage collection threads 312 to execute as fast as possible without interference from threads 308. It is also desirable for threads 308 to stay inactive until garbage collection is completed by garbage collection threads 312.

Some of this type of processing is performed automatically by operating system 314 as a part of normal lock handling processing. The length of time required to perform garbage collection, however, may be longer and require more resources than other types of processing handled by other uses of locks 310. For example, traversing heap 304 accesses more virtual storage. This situation is typical for large multi-gigabyte heaps. As a result, the illustrative embodiments recognize that effective garbage collection by garbage collection threads 312 may be improved through specialized handling.

In these different examples, operating system 314 has garbage collection interface 316. In this example, this garbage collection interface may support registering garbage collection threads in thread registration 318. As a result, when a garbage collection thread within garbage collection threads 312 obtains a lock from locks 310, thread registration 318 may be used to identify the lock as a garbage collection lock. In other words, a garbage collection thread registered in thread registration 318 may be identified when that thread obtains a lock from locks 310.

With this information, operating system 314 may identify a number of different phases for a garbage collection state. In these examples, these phases include starting garbage collection 320, entered garbage collection 322, and completed garbage collection 324. Starting garbage collection 320 may be identified when a garbage collection thread within garbage collection threads 312 obtains a lock from lock 310. Entered garbage collection 322 occurs when all of threads 308 have released any locks from locks 310. Completed garbage collection 324 occurs when garbage collection threads 312 release all of locks 310.

In these examples, when operating system 314 detects starting garbage collection 320, operating system 314 may change the priority of garbage collection threads 312. In particular, the priority of garbage collection threads 312 may be increased. This priority may be increased until any locks obtained by garbage collection threads 312 are released. Once entered garbage collection 322 has occurred, or a lock has been released by a thread within threads 308, the priority of threads 308 may be reduced. In this manner, threads 308 do not contend with garbage collection threads 312 for processor resources. The priorities may be restored after the garbage collection state ends.

In these depicted examples, operating system 314 may change the priority of threads 308 and garbage collection threads 312 by sending priority change 326 to scheduler 328. Scheduler 328 schedules the execution of threads such as threads 308 and garbage collection threads 312.

Additionally, operating system 314 also may perform other operations such as, for example, paging out non-garbage collection threads and paging in garbage collection threads and including expected data area accesses in this paging process. As another example, data areas previously or expected to be used by garbage collection threads may be paged in for use. A processor in a number of processors in a multi-processor data processing system may be assigned to perform the garbage collection.

In an alternative embodiment, the support for garbage collection processing may be performed using profiler 330. Virtual machine 302 may send notification 332 to profiler 330 when a garbage collection state occurs. In this example, virtual machine 302 is used to identify when a garbage collection process occurs as opposed to using operating system 314 as described above. When profiler 330 receives notification 332, profiler 330 may use garbage collection interface 316 to change the priority for garbage collection threads 312. In other examples, profiler 330 may use data collected during previous garbage collection processing to adjust thread priorities and to touch data areas to preload processor caches with heap data.

In these examples, the steps performed by operating system 314 to perform actions to increase the performance of garbage collection may be performed using an operating system process, such as, for example, a device driver or other operating system process within operating system 314.

With this type of embodiment, profiler 330 may notify a device driver such as, for example, device driver 206 in FIG. 2, to obtain thread identification information when garbage collection occurs. This information, collected using the process described in FIG. 2, may be used to obtain an identification of threads that are active during garbage collection as well as the data areas that are active during garbage collection. Although device driver 206 is used in this example, other software components may be used to obtain thread identification information. The application software or virtual machine may designate threads that are garbage collection threads and send this information directly to the device driver or make calls to the operating system directly. These calls may be, for example, increasing or decreasing thread priorities.

In this manner, previously collected information may be used to adjust thread priorities and pre-fetch data in heap data areas. In particular, the priorities for threads 308 may be decreased while the priorities for garbage collection threads 312 may be increased while a garbage collection state is present. This thread information may be stored in history 334 for use by profiler 330.

The illustration of the components in FIG. 2 and garbage collection environment 300 in FIG. 3 are not meant to imply physical and/or architectural limitations to the manner in which different illustrative embodiments may be implemented. For example, in some illustrative embodiments, the identification of different garbage collection states and the management of garbage collection threads may be performed in response to other events other than interrupts 220 and 222 in FIG. 2. Also, in some illustrative embodiments, processes performed by device driver 206 may be implemented in other software components or code depending on the particular implementation.

Figure 4:
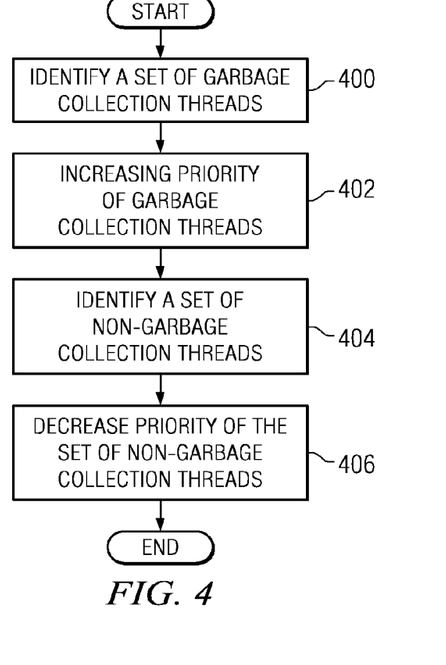
FIG. 4 is a flowchart of a process that may be initiated for other processing when garbage collection is occurring in accordance with an illustrative embodiment.

With reference now to FIG. 4, a flowchart of a process that may be initiated for other processing when garbage collection is occurring is depicted in accordance with an illustrative embodiment. The process illustrated in FIG. 4 may be implemented in an operating system such as, for example, operating system 314 in FIG. 3.

The process begins by identifying a set of garbage collection threads (step 400). Thereafter, the priority of the garbage collection threads is increased (step 402). The process then identifies a set of non-garbage collection threads (step 404). The priority of the set of non-garbage collection threads are decreased (step 406), with the process terminating thereafter.

Of course, other steps also may be performed. For example, data areas previously or expected to be used by garbage collection threads may be paged into memory for use. A processor within a multi-processor system may be assigned to perform garbage collection. The changing of the priority of threads in these examples may be performed by requesting thread priority changes via operating system interfaces.

Of course, various other actions may be performed depending on the condition identified within the operating system. The examples of different conditions and actions that may be initiated are provided for purposes of illustration and not meant to limit the conditions or actions that may be taken. The different illustrative embodiments may monitor for other conditions and perform other actions depending upon the rules within the policy.

Figure 5:
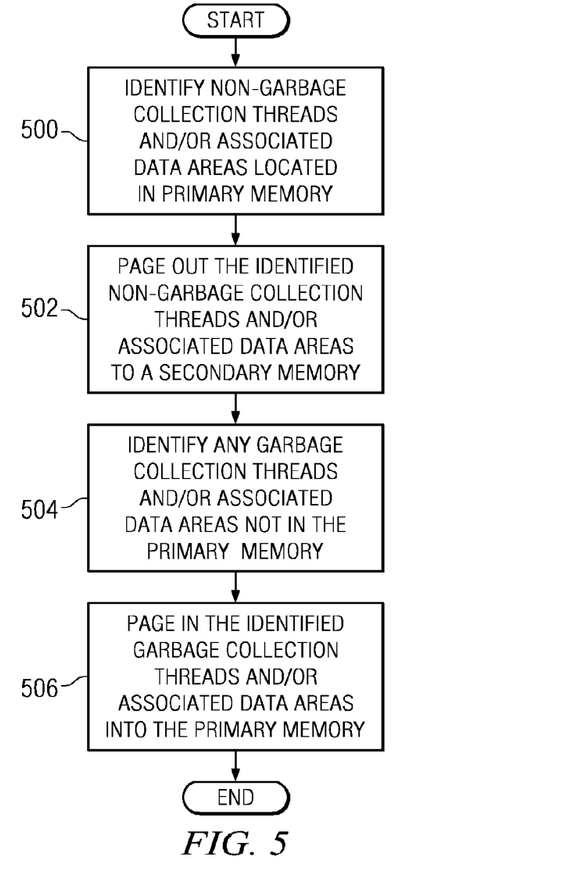
FIG. 5 is a flowchart of a process for increasing garbage collection performance in accordance with an illustrative embodiment.

With reference now to FIG. 5, a flowchart of a process for increasing garbage collection performance is depicted in accordance with an illustrative embodiment. The process illustrated in FIG. 5 may be performed by an operating system such as operating system 314 in FIG. 3. This process may be initiated when a garbage collection condition is detected.

The process begins by identifying non-garbage collection threads and/or associated data areas located in primary memory (step 500). In these examples, the primary memory is a random access memory. The process then pages out the identified non-garbage collection threads and/or associated data areas to a secondary memory (step 502). This secondary memory may be, for example, a hard disk.

The process then identifies any garbage collection threads and/or associated data areas that are not in the primary memory (step 504). The associated data areas may be ones that are expected to be used or touched by the garbage collection threads. The process then pages in the identified garbage collection threads and/or associated data areas into primary memory from the secondary memory (step 506) with the process terminating thereafter.

The different steps illustrated in FIGS. 4 and 5 may be implemented in other software components other than an operating system to manage garbage collection. For example, in other illustrative embodiments, the different processes may be implemented in a virtual machine, a device driver, and/or any application performing garbage collection.

In this manner, the performance of garbage collection may be improved. This performance may be improved through the placement of garbage collection threads and data areas into the primary memory rather than having those threads being accessed from a secondary memory. In these examples, an operating system may perform other processing such as, for example, the steps described above, to enhance garbage collection processes.

Thus, the different illustrative embodiments provide a computer implemented method, apparatus, and computer program code for managing garbage collection. In the different illustrative embodiments, monitoring may be performed for a garbage collection state in a data processing system. If a garbage collection state is detected, the priority of garbage collection threads may be changed. The garbage collection threads may have their priority increased.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing garbage collection, the computer implemented method comprising:
   granting a lock to a thread requesting the lock;
   responsive to granting the lock, identifying whether the thread is one of a set of garbage collection threads;
   responsive to identifying the thread is one of the set of garbage collection threads, initiating a garbage collection state;
   responsive to detecting the garbage collection state, determining whether to change a priority of the thread identified using a policy comprising predetermined criteria including what threads are currently executing, what memory ranges are being accessed, and what processes are executing;
   responsive to meeting the predetermined criteria, increasing a priority of each garbage collection thread identified in the set of garbage collection threads, wherein increasing the priority of each garbage collection thread in the set of garbage collection threads further comprises:
      paging in other ones of the set of garbage collection threads, including expected data area accesses for the other ones of the set of garbage collection threads; and
      paging in expected data area accesses for the thread identified;
   responsive to detecting the garbage collection state, decreasing a priority of each thread in a set of non-garbage collection threads.

2. The computer implemented method of claim 1 further comprising: responsive to detecting the garbage collection state, paging out the set of non-garbage collection threads.

3. The computer implemented method of claim 1 further comprising: responsive to detecting the garbage collection state, paging out data areas associated with the set of non-garbage collection threads.

4. The computer implemented method of claim 1 further comprising: responsive to detecting the garbage collection state, paging in data areas previously or expected to be used by the set of garbage collection threads.

5. The computer implemented method of claim 1 further comprising: responsive to detecting the garbage collection state, assigning a processor to perform the garbage collection in a number of processors in a multi-processor data processing system.

6. The computer implemented method of claim 1 further comprising: responsive to ending the garbage collection state, increasing a priority of a number of threads not required for the garbage collection.

7. The computer implemented method of claim 1, wherein responsive to detecting the garbage collection state further comprises monitoring for the garbage collection state, and wherein the monitoring further comprises: waiting to receive a notification of the garbage collection state from one of a profiler and a virtual machine.

8. The computer implemented method of claim 7, wherein the monitoring further comprises:
   monitoring a set of locks associated with a heap for the garbage collection thread obtaining the lock from the set of locks.

9. The computer implemented method of claim 8, wherein the garbage collection thread is registered to allow for an identification of the garbage collection thread when the garbage collection thread obtains the lock.

10. The computer implemented method of claim 1, wherein the garbage collection state is detected on a periodic basis.

11. The computer implemented method of claim 1, wherein the computer implemented method is implemented in at least one of a device driver, a virtual machine, an operating system, and an application performing the garbage collection.

12. A computer comprising:
   a bus;
   a storage device connected to the bus, wherein program code is stored on the storage device; and
   a processor unit is connected to the bus, wherein the processor unit executes the program code:
   to grant a lock to a thread requesting the lock;
   responsive to granting the lock, to identify whether the thread is one of a set of garbage collection threads;
   responsive to identifying that the thread is one of the set of garbage collection threads, to initiate a garbage collection state;
   responsive to detecting the garbage collection state, to determine whether to change a priority of the thread identified using a policy comprising predetermined criteria including what threads are currently executing, what memory ranges are being accessed, and what processes are executing;
   responsive to meeting the predetermined criteria, to increase a priority of each garbage collection thread identified in the set of garbage collection threads, wherein increasing the priority of each garbage collection thread in the set of garbage collection threads further comprises:
      paging in other ones of the set of garbage collection threads, including expected data area accesses for the other ones of the set of garbage collection threads; and paging in expected data area accesses for the thread identified; and responsive to detecting the garbage collection state, to decrease a priority of each thread in a set of non-garbage collection threads.

13. The computer of claim 12, wherein the processor unit further executes the program code to page out the set of non-garbage collection threads in response to detecting the garbage collection state.

14. The computer of claim 12, wherein the processor unit further executes the program code to page out data areas associated with the set of non-garbage collection threads in response to detecting the garbage collection state.

15. The computer of claim 12, wherein the processor unit further executes the program code to page in data areas previously or expected to be used by the set of garbage collection threads in response to detecting the garbage collection state.

16. The computer of claim 12, wherein the processor unit further executes the program code to assign a processor to perform the garbage collection in a number of processors in a multi-processor data processing system in response to detecting the garbage collection state.

17. The computer of claim 12, wherein the processor unit further executes the program code to increase a priority of a number of threads not required for the garbage collection in response to ending the garbage collection state.

18. A computer program product for managing garbage collection, the computer program product comprising:

a non-transitory computer recordable storage medium;

program code, stored on the non-transitory computer recordable storage medium, for granting a lock to a thread requesting the lock;

program code, stored on the non-transitory computer recordable storage medium, responsive to granting the lock, for identifying whether the thread is one of a set of garbage collection threads;

program code, stored on the non-transitory computer recordable storage medium, responsive to identifying the thread is one of the set of garbage collection threads, for initiating a garbage collection state;

program code, stored on the non-transitory computer recordable storage medium, responsive to detecting the garbage collection state, for determining whether to change a priority of the thread identified using a policy comprising predetermined criteria including what threads are currently executing, what memory ranges are being accessed, and what processes are executing;

program code, stored on the non-transitory computer recordable storage medium, responsive to meeting the predetermined criteria for increasing a priority of each garbage collection thread identified in the set of garbage collection threads, wherein increasing the priority of each garbage collection thread in the set of garbage collection threads further comprises:

program code, stored on the non-transitory computer recordable storage medium, for paging in other ones of the set of garbage collection threads, including expected data area accesses for the other ones of the set of garbage collection threads; and program code, stored on the non-transitory computer recordable storage medium, for paging in expected data area accesses for the thread identified; and program code, stored on the non-transitory computer recordable storage medium, responsive to detecting the garbage collection state, decreasing a priority of each thread in a set of non-garbage collection threads.

19. The computer program product of claim 18 further comprising: program code, stored on the non-transitory computer recordable storage medium, responsive to detecting the garbage collection state, for paging out the set of non-garbage collection threads.

20. The computer program product of claim 18 further comprising: program code, stored on the non-transitory computer recordable storage medium, responsive to detecting the garbage collection state, for paging out data areas associated with the set of non-garbage collection threads.

21. The computer program product of claim 18 further comprising: program code, stored on the non-transitory computer recordable storage medium, responsive to detecting the garbage collection state, for paging in data areas previously or expected to be used by the set of garbage collection threads.

22. The computer program product of claim 18 further comprising: program code, stored on the non-transitory computer recordable storage medium, responsive to detecting the garbage collection state, for assigning a processor to perform the garbage collection in a number of processors in a multi-processor data processing system.

* * * * *